United States Patent [19]

Jarvinen

[11] 4,263,557
[45] Apr. 21, 1981

[54] POWER CONVERTER CONTROL

[75] Inventor: Willard B. Jarvinen, Roanoke, Va.

[73] Assignee: General Electric Company, Salem, Va.

[21] Appl. No.: 927,795

[22] Filed: Jul. 25, 1978

Related U.S. Application Data

[63] Continuation of Ser. No. 743,863, Nov. 22, 1976, abandoned.

[51] Int. Cl.³ .............................................. H02P 5/16
[52] U.S. Cl. .................................. 318/341; 318/314; 318/318
[58] Field of Search ............... 318/341, 345 E, 345 R, 318/314, 318; 363/87, 129

[56] References Cited

U.S. PATENT DOCUMENTS

| | | | |
|---|---|---|---|
| 3,946,293 | 3/1976 | Feld | 318/230 |
| 4,028,609 | 7/1977 | Detering | 363/129 |
| 4,066,941 | 1/1978 | Foster | 318/341 |
| 4,104,570 | 8/1978 | Hamby et al. | 318/318 |

OTHER PUBLICATIONS

Bose et al, "Digital Speed Control of a DC Motor With Phase-Locked Loop Regulation", *IECI Proceedings*, Mar. 21-23, 1977.

*Primary Examiner*—David Smith, Jr.
*Attorney, Agent, or Firm*—Arnold E. Renner

[57] ABSTRACT

A circuit for controlling the rendering conductive of the controlled rectifiers of a power conversion unit to thereby control the power supplied to a load from a source of alternating current voltage employs a single means to sense a prescribed phase relationship between adjacent phase to neutral voltages of the source which means is utilized to develop a digital count representing a time-phase relationship with respect to the point determined. The digital count thus developed is supplied to a memory system to address that system and based upon the contents of the locations within the memory system thus addressed there is provided an output which determines the time and firing sequence of the rectifiers of the power conversion system. This output is then utilized to generate suitable signals which are applied to the rectifiers of the power conversion system to thereby control the power supplied to the load.

16 Claims, 9 Drawing Figures

DECODE TRUTH TABLE

| IPA | 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|---|
| IPB | 0 | 0 | 1 | 1 | 0 | 0 | 1 | 1 | 0 | 0 | 1 | 1 | 0 | 0 | 1 | 1 |
| IPC | 0 | 0 | 0 | 0 | 1 | 1 | 1 | 1 | 0 | 0 | 0 | 0 | 1 | 1 | 1 | 1 |
| IPD | 0 | 0 | 0 | 0 | 0 | 0 | 0 | 0 | 1 | 1 | 1 | 1 | 1 | 1 | 1 | 1 |
| CELLS FIRED | | 1F 2F | 2F 3F | 3F 4F | 4F 5F | 5F 6F | 6F 1F | | | 1R 2R | 2R 3R | 3R 4R | 4R 5R | 5R 6R | 6R 1R |  |

POWER CONVERTER CONTROL

This is a continuation of application Ser. No. 743,863, filed Nov. 22, 1976.

BACKGROUND OF THE INVENTION

The present invention relates generally to firing circuits for thyristor power conversion systems and more particularly to an improved circuit for controlling the operation of the power conversion system which supplies an electrical load from a polyphase alternating current (a.c.) source.

There are many circuits and systems available today for selectively rendering conductive the controlled rectifiers of the various types of converters for supplying electrical power to a load from a polyphase a.c. source. The type of rectifier used will, of course, control to some degree the type of control utilized but by far the most common controlled rectifier in use today is a thyristor of the silicon controlled rectifier type. The thyristor becomes conductive with the simultaneous application of a forward bias voltage and a signal applied to its gate electrode and remains conductive until a zero or negative voltage is placed across its anode and cathode.

A large variety of problems exist in the control of power converters. Included among these problems is the fact that, because the magnitude of the gate signal required to render a thyristor conductive is not large, adequate protection from electrical noise, both line and otherwise, must be provided to prevent a erroneous thyristor firing. In addition, the ability to alter and optimize firing sequence, particularly in a reversing converter, is very desirable in order to provide smooth, continuous system operation. Further, it is necessary to provide means for recovery of the system in the event a thyristor for some reason is conducting at an improper time. The most common reason for improper conduction is that a thyristor fails to commutate (turn off) at the proper time and the customary correction method is to fire the next scheduled to conduct thyristor at an earlier than normal time to force the erroneously conducting thyristor into a nonconducting state. This is commonly called "force firing". A further problem which is particularly prevelant in polyphase converter circuits is the need to synchronize the thyristor firing properly in each phase. This is customarily achieved by closely matching each phase firing circuit to obtain uniform action. Component aging and temperature drift render maintenance of proper synchronization and matching difficult.

All of the above problems are recognized in the art and many solutions have been proposed, often at a relatively high cost. Usually a compromise is reached between cost and performance.

SUMMARY OF THE INVENTION

It is, therefore, an object of the present invention to provide an improved firing circuit for a power converter.

It is a further object to provide a moderate cost, high performance firing control for a polyphase electrical power converter.

It is a further object to provide a control for a polyphase converter firing circuit which uses a single comparison to control all phases.

It is a still further object to provide a polyphase power converter control which is readily adaptable to altering and optimizing firing sequence.

Still another object is to provide a control for a polyphase power converter which is isolated from electrical line noise.

It is another object to provide a polyphase power conversion control which readily permits the force control firing of individual cells of the converter for correcting improperly conducting cells.

The foregoing and other objects are provided in accordance with the present invention by first determining a prescribed relationship between two adjacent phase to neutral voltages of the a.c. source. In response to the sensing of this point, a digital count representing a timephase relationship with respect to that point is developed and this count is used as an address for accessing the contents of storage locations within a memory system. The contents of the memory system thus addressed contain data which specify or designate the time and firing sequence for the rectifiers of the power conversion system and, in response to these contents, signals are developed which are then utilized to render conductive the individual rectifiers of the power conversion system.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
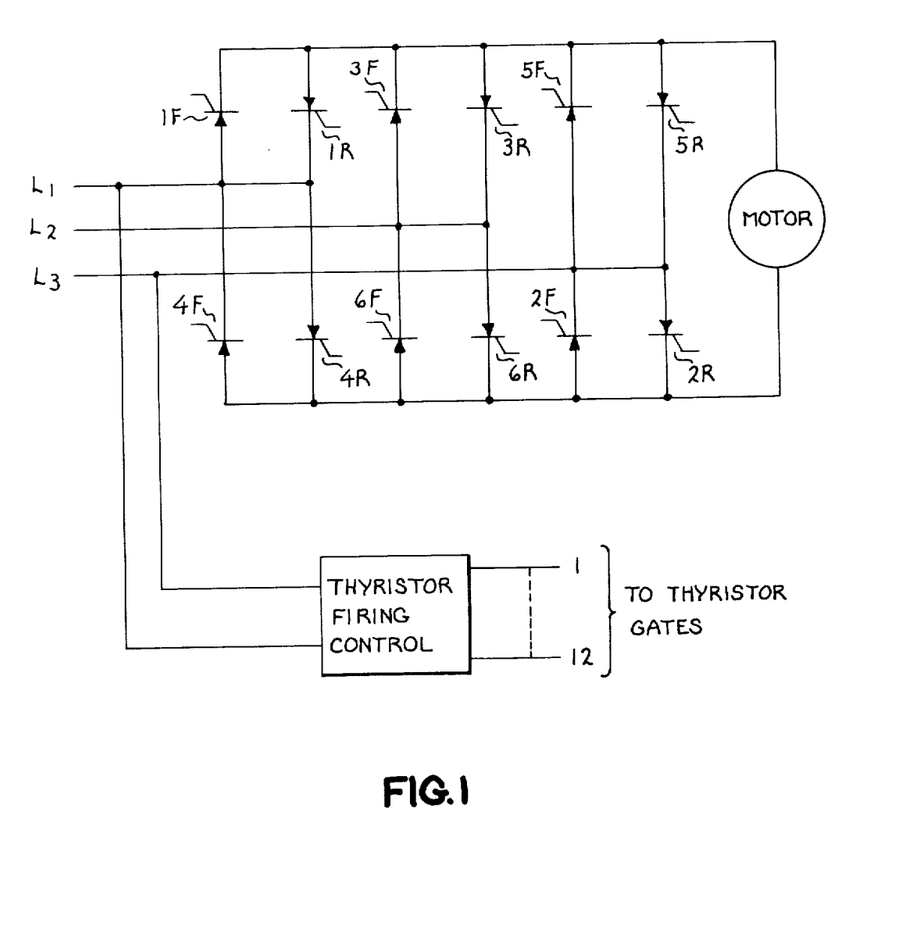
FIG. 1 is a schematic drawing showing one type of power conversion system to which the present invention is applicable and demonstrating the overall relationship of the invention to the power conversion system.

Referring now to FIG. 1, there is shown a typical power conversion system for supplying the power to a motor load which in this case might be reversible d.c. motor. As illustrated in FIG. 1, the a.c. source is three phase as depicted by the lines $L_1$, $L_2$ and $L_3$ and the bridge itself is comprised of twelve thyristors which are under the control of a thyristor firing control of the present invention. The actual power conversion bridge includes six forward thyristors 1F through 6F and six reverse thyristors 1R through 6R. Connection of the source, that is lines $L_1$, $L_2$ and $L_3$, to the bridges is in the conventional manner as illustrated and the output of the bridge is supplied to the motor. During forward motoring operation the firing is effected on the forward thyristors 1F through 6F and for reverse operation of the motor thyristors 1R through 6R are rendered conductive. The thyristor firing control receives inputs, in accordance with the present invention, from two of the three source lines shown in FIG. 1 as lines $L_1$ and $L_3$. The outputs of the thyristor firing control are twelve lines which are connected, respectively, through suitable isolating means to the gate electrodes of the twelve thyristors of the bridge. For sake of simplicity the actual connections to the gates have not been shown.

Figure 2:
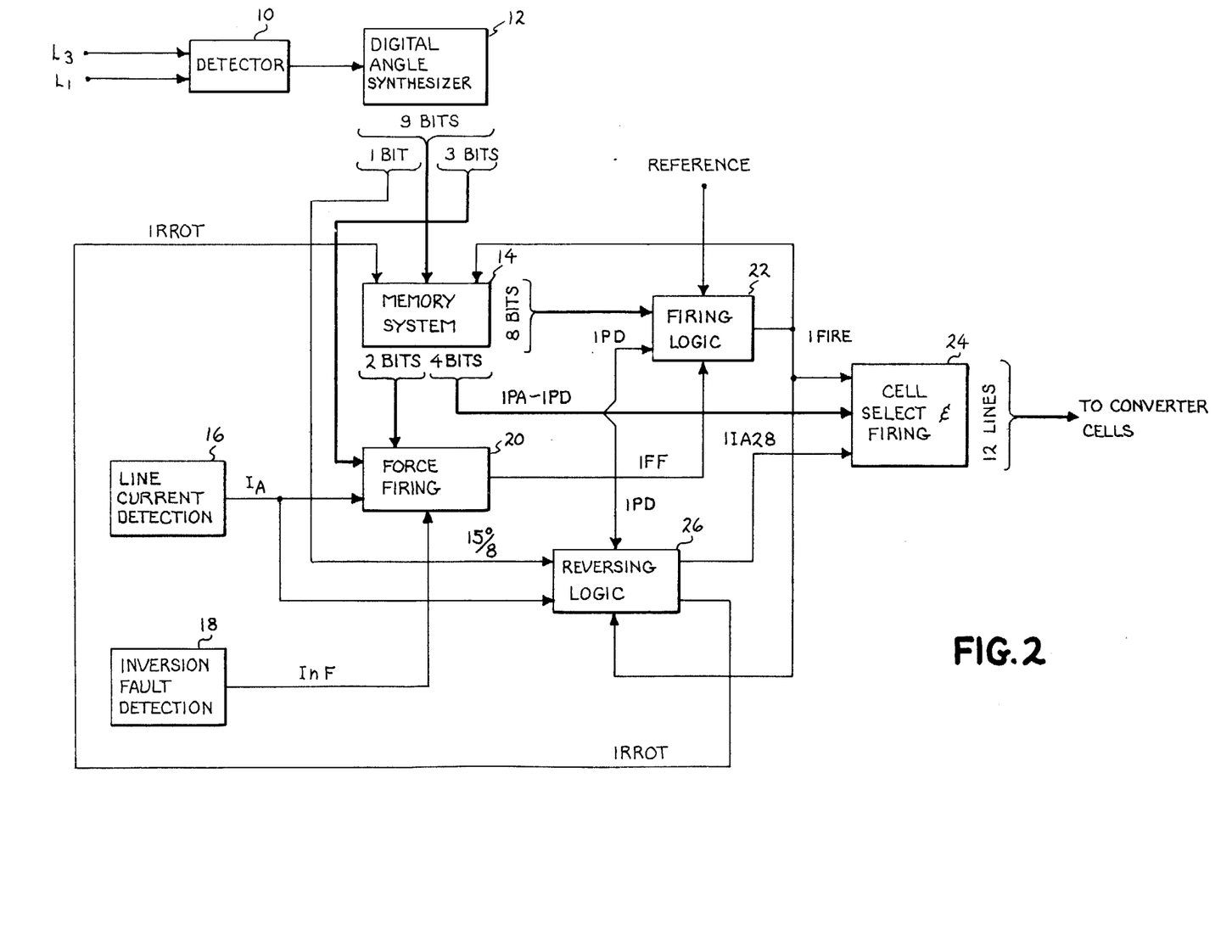
FIG. 2 is a major block diagram illustrating the operation of the present invention.

FIG. 2 shows the present invention in its preferred embodiment in major block form. As shown in FIG. 2, inputs from lines $L_3$ and $L_1$ are provided to a detector 10 which detects a specified phase relationship between the voltages appearing on these two lines. As will be further explained hereinafter, the voltage relationship selected for this implementation is when $L_1$ goes positive with respect to $L_3$. The output of the detector 10 is a d.c. level signal which forms the input to a digital angle synthesizer 12. Synthesizer 12 produces a digital count, in the present embodiment a 9-bit count, representing a phase angle measured from the point detected by the detector. The full 9-bit output of the synthesizer 12 is supplied as an addressing input to a memory system 14. Memory system 14 is responsive to the output of the synthesizer 12 in conjunction with the signal designated 1RROT (specifying which group of thyristors will be used) and a synchronizing signal 1FIRE to provide output signals defining a sinusoidal wave shape as well as defining the selection of cells to be fired. In addition, there is provided an output which designates a shift of angle of either 60 or 120 degrees which is utilized to implement the forced firing of certain cells when abnormal conditions require and permit the time sharing of the sinusoidal wave.

A line current detection circuit 16 senses the presence of current in the a.c. supply lines and provides an output signal $I_4$ indicative of the magnitude of that current.

An inversion fault detection circuit 18 is provided to develop an output signal InF when a d.c. fault occurs within the system. A d.c. fault is essentially the existence of two thyristors in the same phase of the bridge being conductive at the same time such that the bridge and load are essentially short circuited. This normally results from the failure of commutation of one of the thyristors. The line current detection circuit 16 and the inversion fault detection circuit 18 both provide their output signals to a force firing circuit 20 which also receives as inputs, three bits from the digital angle synthesizer 12 and a 2-bit input from the memory system 14. The nature of the force firing circuit 20 is such that it provides an output signal IFF which is applied to firing logic circuit 22 when the conditions within the system necessitate a forced firing of a thyristor so as to correct a fault. The firing logic 22 also receives an 8-bit input from the memory system 14 which is instantaneously representative of the instantaneous value of a sinusoidal wave, here a cosine wave. Additional inputs to the firing logic circuit 22 are from a reference which may be operator adjustable to specify the level of operation desired from the overall converter system as well as a signal 1PD which is derived from the memory system 14. The output of the firing logic circuit 22 is a signal 1FIRE which is the basic signal utilized to initiate signals to be applied to the gating circuits of the rectifiers (cells) of the converter bridge to render them conductive.

The 1FIRE signal is applied to a cell select and firing circuit 24 which also receives a 4-bit input (1PA-1PD) from the memory system 14 designating which of the thyristors of the bridge is to be fired and an additional signal 11A28 which is derived from a reversing logic circuit 26. In response to these signals the cell select and firing circuit selectively provides outputs on twelve output lines which are connected through suitable isolation circuitry to the individual gating electrodes of the twelve thyristors of the bridge and serve to render them conductive at the appropriate time.

In order to provide reverse operation capability, there is further provided a reversing logic circuit 26 which receives the signals 1FIRE, $I_4$ and a signal from the digital angle synthesizer 12 designated 15°/8. Also included is the 1PD signal from the memory system 14. This reversing logic circuit governs the direction of rotation and outputs the signal 1RROT previously mentioned as well as the signal 11A28.

The foregoing provides an overview of the system of the present invention and it is seen that the basic philosophy of the system is to detect a particular point in the phase relationship of the line voltages and to develop a digital count specifying a time-phase relationship with respect thereto. This digital count accesses memory locations which in turn provide designations specifying the next cell to be fired and the present phase angle of that cell in relation to its normal firing range. Means are further provided for bidirectional operation as well as for the force firing of bridge thyristors under specified conditions or selected conditions as will be more fully explained hereinafter.

Figure 5:
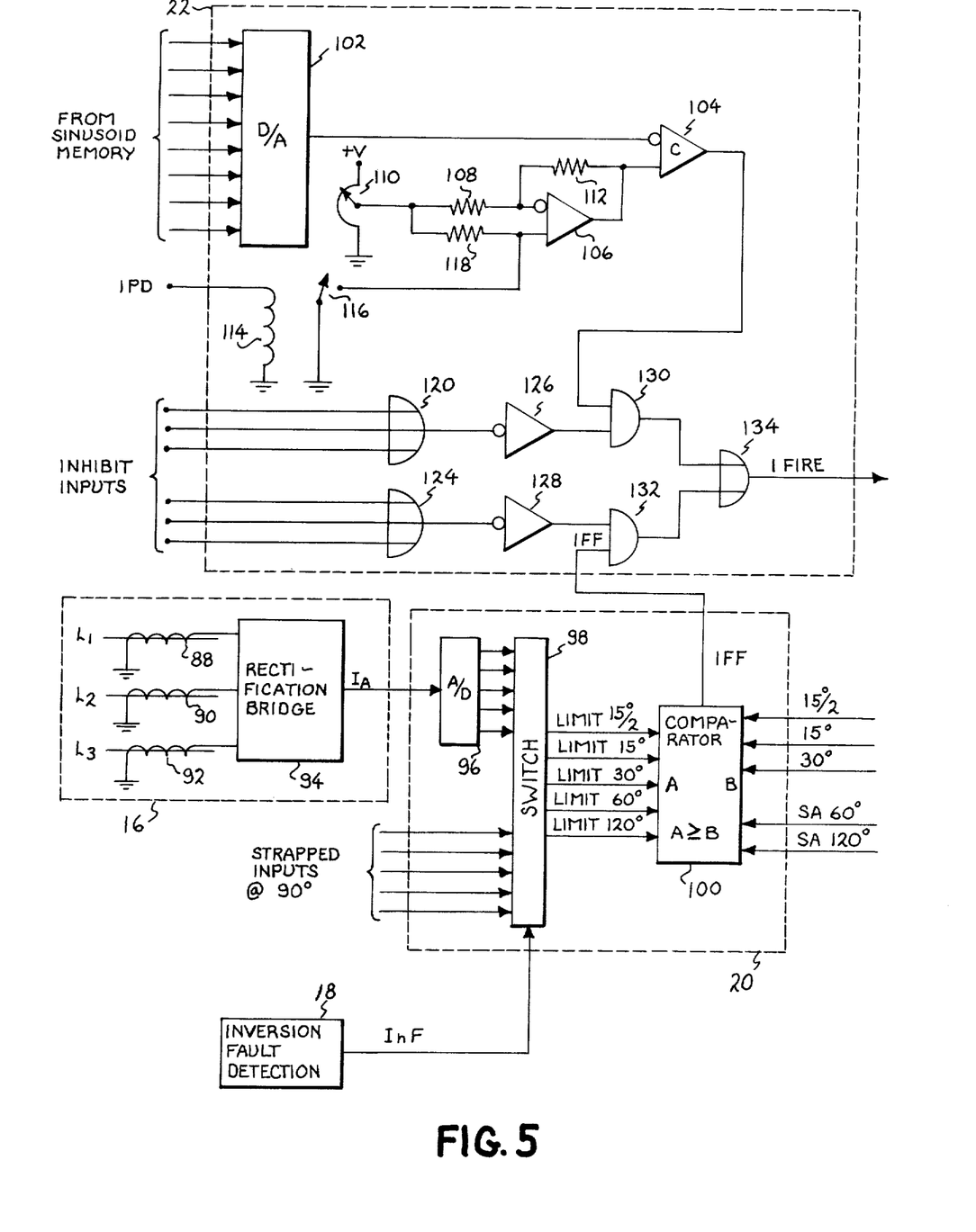
Figure 6:
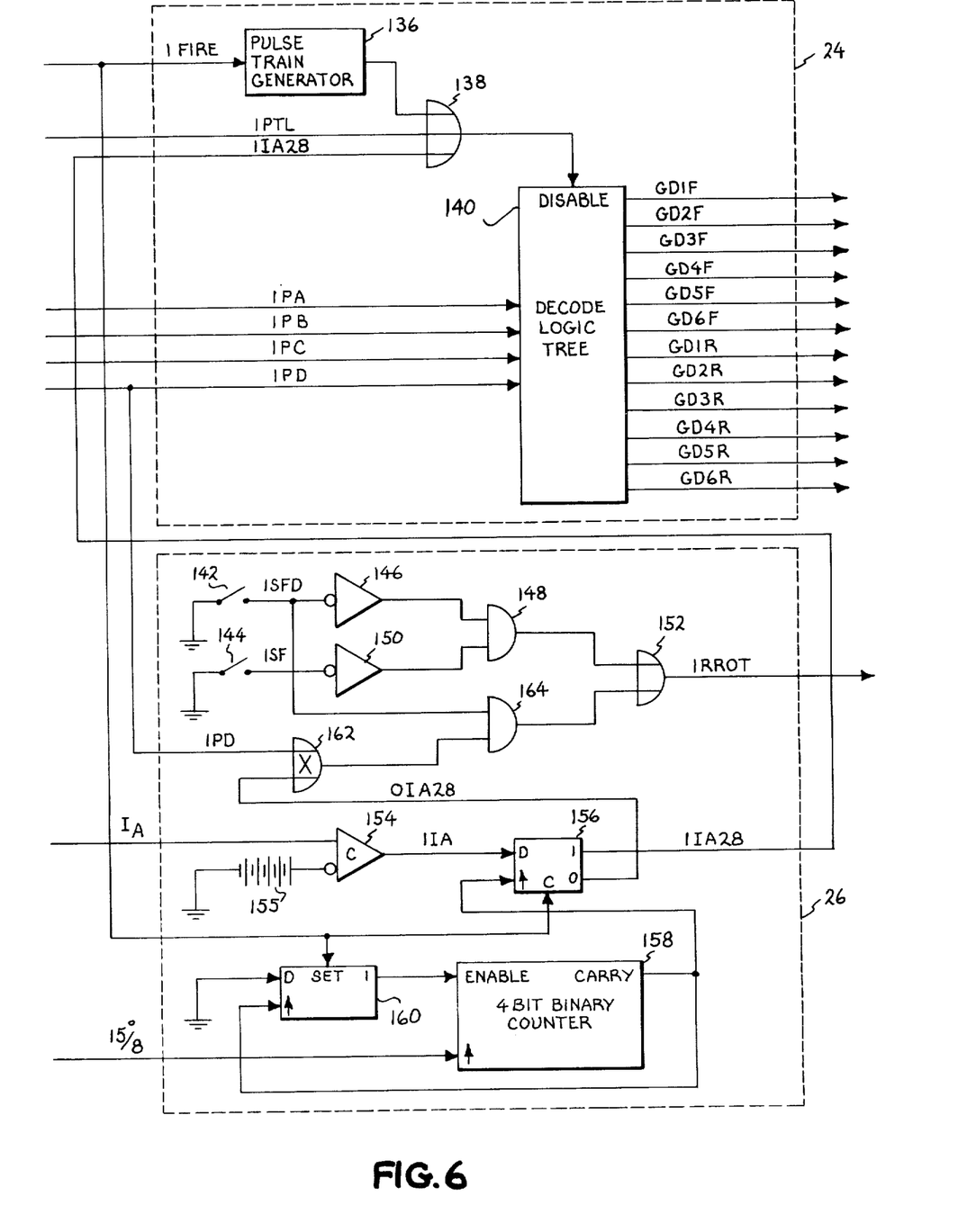
Figure 7:
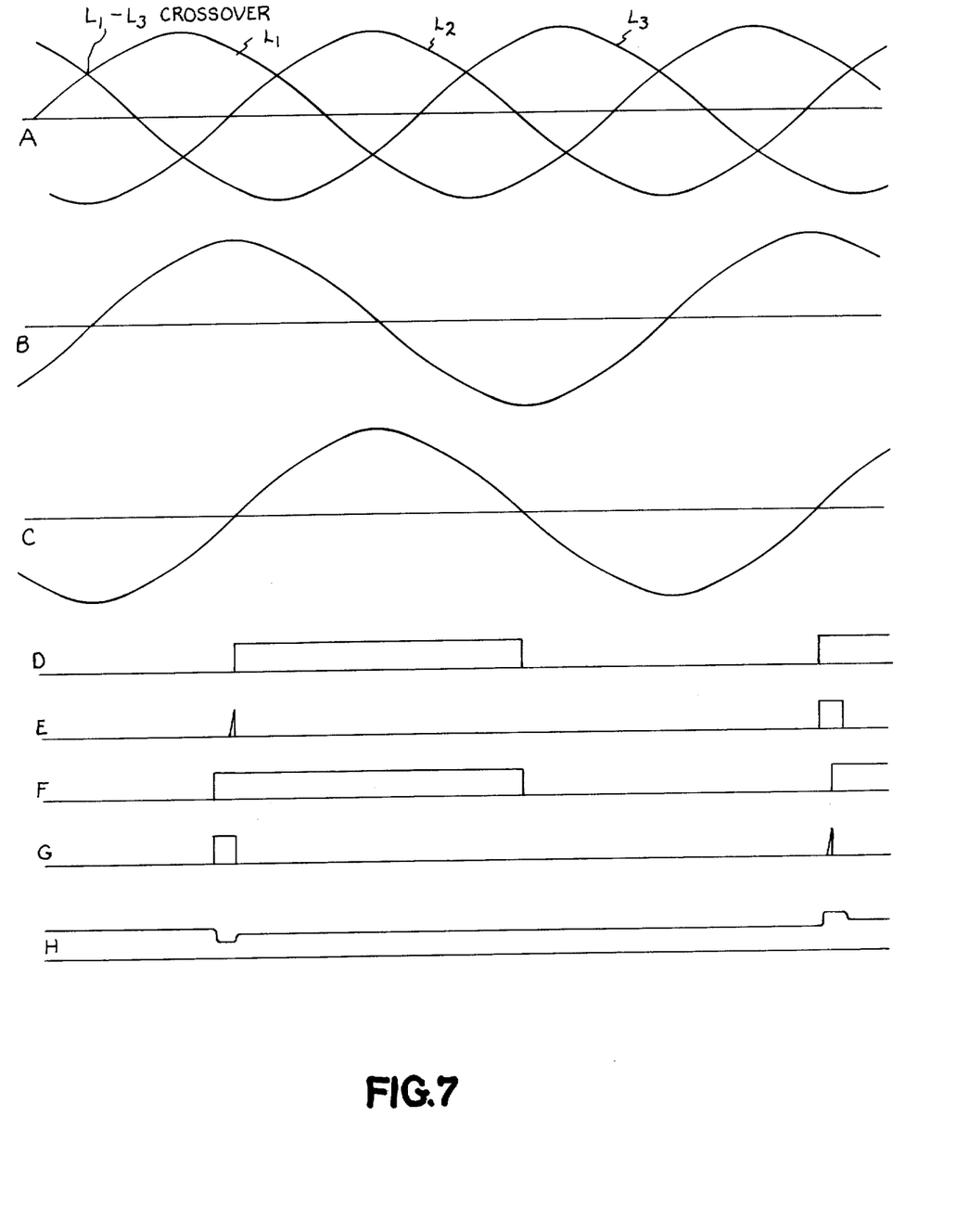
FIG. 7 illustrates various waveforms helpful in understanding the operation of the present invention.
Figure 8:
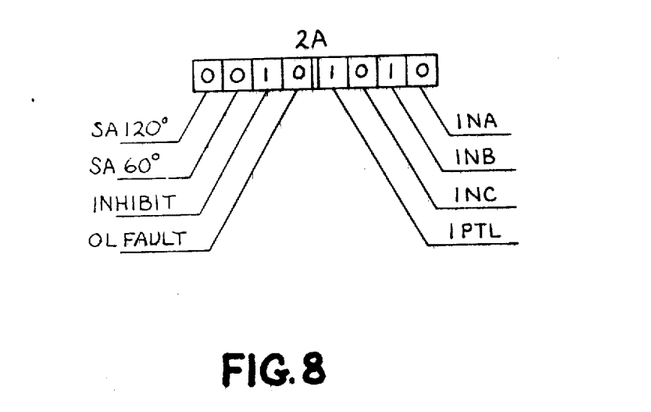
FIG. 8 illustrates the word format of one of the word types stored in the memory system; and, FIG. 9 is a decode truth table useful in understanding the operation of a portion of the present invention.
Figure 9:
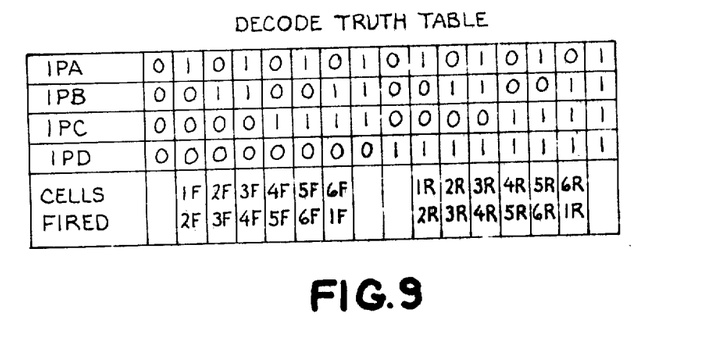

FIGS. 3 through 6 when taken in conjunction with FIGS. 7, 8 and 9 explain in greater detail the operation of the system of the present invention. Referencing first FIG. 3, it is seen that signals from lines $L_3$ and $L_1$ are applied to an operational amplifier 30 by way, respectively, of two input resistors 32 and 34. The signal from $L_3$ is applied, via resistor 32, to the inverting input of the amplifier 30 while the signal $L_1$ is applied by way of resistor 34 to the noninverting input which further has a connection by way of resistor 36 to ground. A feedback resistor 38 is connected between the inverting input and the output of the operational amplifier 30. Amplifier 30 acts as a differential amplifier the output of which is represented in graph B of FIG. 7. Referencing FIG. 7, graph A shows the line to neutral relationship of a three phase source in which the three phases are, respectively, labeled $L_1$, $L_2$ and $L_3$. As shown in graph B of FIG. 7, the output of the amplifier 30 is a sine wave which is essentially a scaled replica of the difference between $L_1$ and $L_3$. It should, perhaps, be noted that the above method of achieving this signal is necessitated by the fact that in the standard three phase source there is no neutral available.

The output of the amplifier 30 is applied to a filter—90° phase shift network 40 whose primary purpose is to filter the output of the amplifier 30 but which in this particular instance also happens to develop a 90 degree phase shift. The output C of the filter 40, as shown in FIG. 7 at graph C, is the same as the sine wave B except shifted 90 degrees. The output of the filter 40 is applied to the noninverting input of a comparator 42 which has its inverting input tied to ground. As such, the output of the comparator 42 will be a level signal D which rises when the signal C crosses the zero axis going in the positive direction and falls when the output signal C again crosses the zero axis but going in the negative direction. Thus, as shown in graph D of FIG. 7, there will be as an output of the comparator 42 a signal which is present for 180 electrical degrees.

The signal from comparator 42 serves as an input to a "D" or trigger flip-flop 44 within the digital angle synthesizer 12. Flip-flops of this type normally have a trigger terminal indicated by an arrow, a D input terminal and may or may not include a clear terminal C. Output is by way of the customary "1" and/or "0" terminals. In the operation of this type of flip-flop, the output 1 will equal the input on the D terminal with the occurrence of a trigger or clock signal applied to the trigger terminal. In the present instance, the output from the comparator 42, signal D, is applied to the trigger input of the flip-flop 44 which has its D terminal connected to a positive voltage represented by +V. The output of the flip-flop 44, represented as signal E as may be seen from graph E of FIG. 7, is in this instance a small spike voltage. The clear terminal of the flip-flop 44 receives an input from an AND gate 46 which receives as one input the signal E from the flip-flop 44. The second input to the AND gate 46 is from the output of a second flip-flop 48 which has its D terminal connected to the +V voltage and its trigger terminal supplied with a signal F which is shown (FIG. 7, graph F) as a d.c. level existing for 180 degrees. The derivation of signal F will be explained hereinafter. The output of the AND gate 46 is connected to the clear terminals of the two flip-flops 44 and 48 so as to reset those flip-flops at the appropriate time. The output of the flip-flop 48 is shown in FIG. 7 by graph G and in the first occurrence is shown to be a pulse which occurs for a relatively short period of time.

The outputs of the two flip-flops 44 and 48 are supplied as inputs to an operational amplifier 50 which serves in conjunction with its associated circuitry as a low pass filter having limited integrating capabilities. To this end, the signal E from the flip-flop 44 is provided to the noninverting input of the amplifier 50 by way of an input resistor 52 and this same terminal is connected to ground by way of the series connection of a resistor 54 and a capacitor 56. The output of the flip-flop 48, signal G, is applied to the inverting input of the amplifier 50 by way of a resistor 58 and this inverting input is further connected to the output of the amplifier 50 by way of a series connection feedback path including a resistor 60 and a capacitor 62. The output of the amplifier 50 may be considered as an error signal and, as will become apparent as this description proceeds and as may be seen from graph H of FIG. 7, compensates for minor drifts in the frequency of the source voltage.

Figure 3:
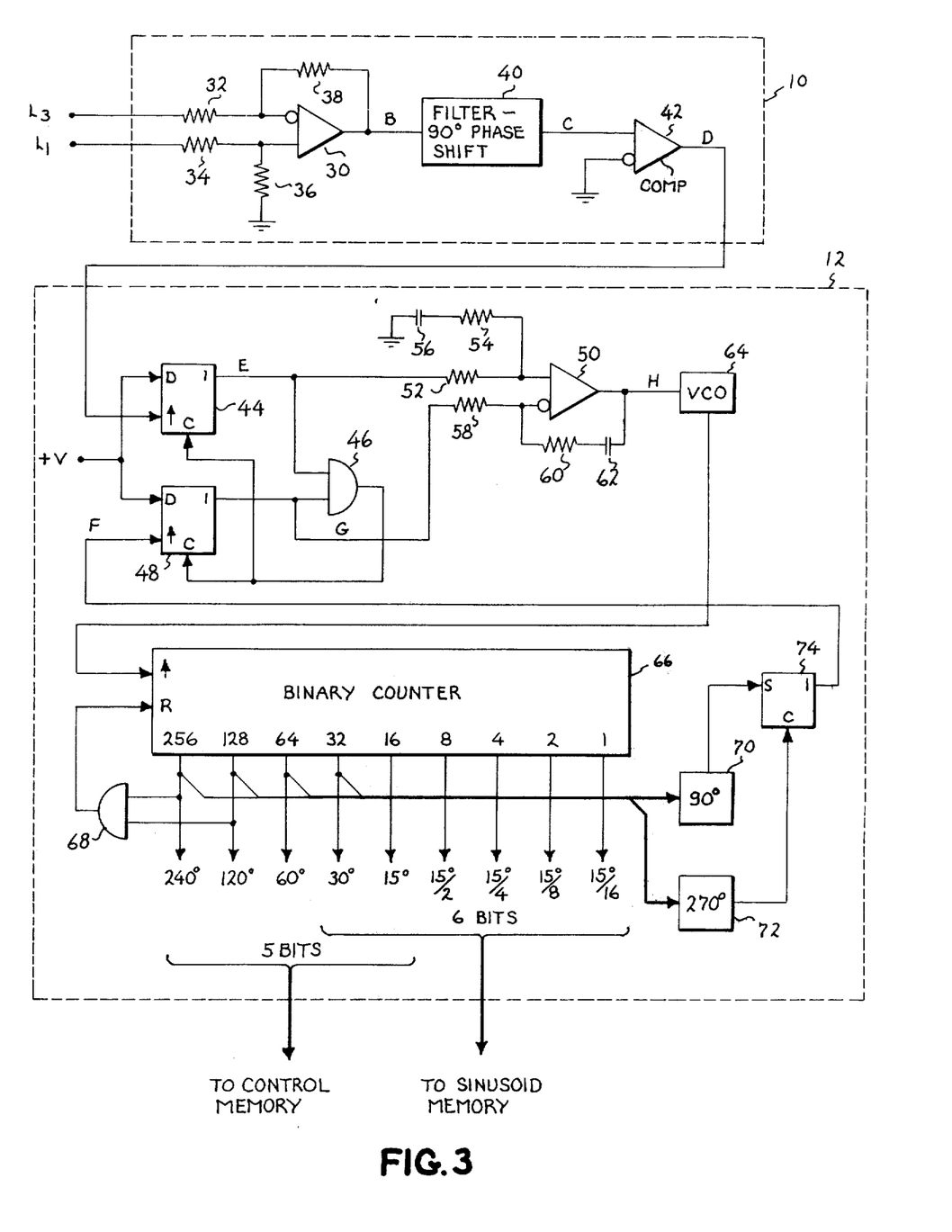
FIGS. 3 through 6 are detailed schematic drawings illustrating the several components of the invention illustrated in block form in FIG. 2.

As shown in FIG. 3, the output from the operational amplifier 50, signal H, is applied to a voltage controlled oscillator 64 which serves to develop a signal having a frequency which is controlled to be a multiple of the instantaneous line frequency. That is, the output of the voltage control oscillator 64 will be a function of the input signal H and from FIG. 7 it is seen that signal H may vary momentarily from steady state values in response to small line frequency variations such that the output of the voltage controlled oscillator will also vary. In the specific embodiment of the invention here being explained, the voltage controlled oscillator 64 provides an output signal having a frequency which is 768 times the line frequency. The actual frequency selected is to an extent arbitrary but it should be large enough to divide the 360 degree line frequency period into an adequate number of parts to provide good resolution. As will be understood from that which immediately follows, this particular selected frequency divides the 360 degree line frequency period into segments of 15/16 degrees.

The output of the voltage controlled oscillator 64 is applied to the trigger terminal of a digital (e.g. binary) counter 66. Binary counter 66 is shown having nine outputs which are, respectively, designated by numerical values equal to $2^0$ through $2^8$. These outputs are also designated by the corresponding powers of two times 15/16 degrees. Thus, the output ranges from 15/16 degrees to 240 degrees. In actuality, the binary counter 66 is a 10-bit counter with its least significant bit "dummied" so that there is provided, at the lowest order output shown, a pulse which stays in one of its states for a time of 15/16 degrees. The 240 degree and 120 degree outputs of the binary counter 66 form inputs to an AND gate 68 the output of which is delivered to the reset terminal of the binary counter so that with each 360 degrees of the line frequency, the binary counter is reset and the count is restarted with the occurrence of the pulses from the voltage control oscillator 64.

As further shown in FIG. 3, the outputs corresponding to 30 degrees, 60 degrees, 120 degrees and 240 degrees, are provided to two blocks 70 and 72 labeled, respectively, 90° and 270°. These blocks represent simple logic trees which serve to provide output signals when the count from the counter corresponds to the angle indicated. That is, when the 60° and 30° lines are high and the 120° and 240° lines are low, the block labeled 90° provides an output signal. In a similar manner when the 240° and the 30° lines are high with the 120° and 60° lines being low, the block labeled 270° provides an output signal. The signals from the 90° block 70 and the 270° block 72 are applied, respectively, to the set and clear terminals of a flip-flop 74 the output of which forms the signal F previously described. Thus, it is seen that signal F will appear or be present for 180 degrees.

The manner in which the error signal earlier briefly discussed is generated may now be more fully understood. In the graphs of FIG. 7 it was assumed, as shown by signal F, that there had been a slight frequency shift in the source voltage such that the voltage controlled oscillator in the cycle previous to that illustrated ran at a slightly faster rate than in the FIG. 7 showing. Thus, signal F came up slightly before the zero crossing of signal C to thus generate signal G for a short period of time. With the concurrence of the signal C zero crossing, signal D was supplied to flip-flop 44 thus causing the output of AND gate 46 to reset both flip-flops 44 and 48 as previously discussed. The generation of signal G thus developed in turn generated the error signal H. To the right, in the graphs of FIG. 7, is shown the effect of a decrease in the output frequency of the oscillator 64 to which a similar analysis would apply. The depictions of FIG. 7 are, of course, for purposes of illustration vastly exaggerated in that frequency drifts would normally be very small and the amount of correction would, therefore, be very small.

Figure 4:
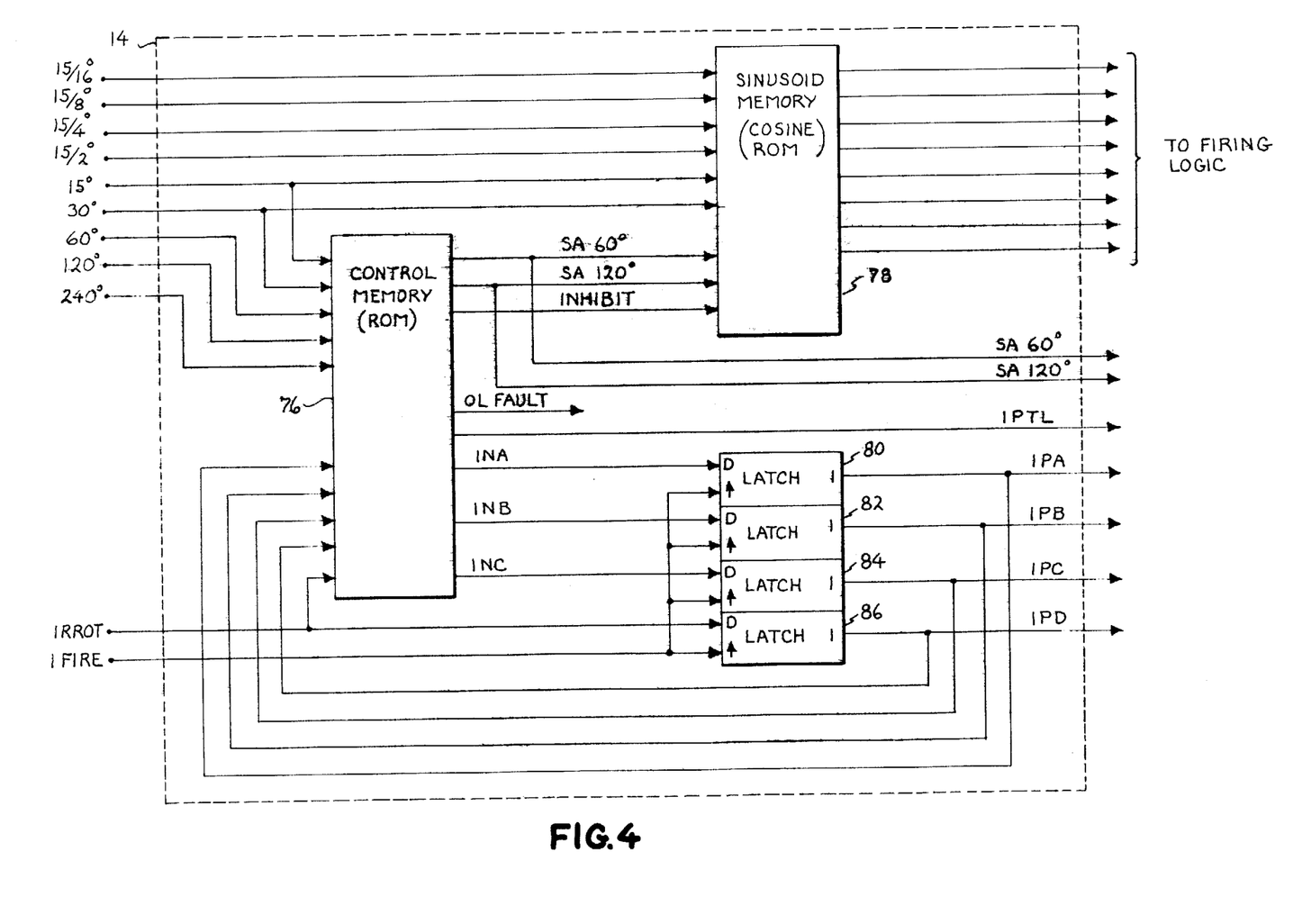

The nine outputs of the binary counter 66 serve as inputs to the memory system 14 as illustrated in FIG. 4. Memory system 14 includes a control memory 76 and a sinusoid memory 78. In the embodiment of the invention as actually implemented these two memories were read only memories (ROM) although as will be obvious any form of memory which does not have a destructive readout may be utilized. Concerning first the control memory 76, this memory provides a plurality of locations which are individually addressed as will be described. In the particular embodiment of the present invention which was built, control memory 76 contained hexadecimal locations from 000 to 3FF. Each location contains an 8-bit word which is divided into two 4-bit bytes. FIG. 8 illustrates, as an example, the content of a memory location defined by hexadecimal 2A. The three least significant bits of the least significant byte contain the indentification of the cell(s) next to be fired. In FIG. 8, as in the other figures, this designation is shown by the signals or designations 1NA, 1NB and 1NC. The most significant bit of this byte contains a designation 1PTL (pluse train limit) which will be more fully described hereinafter. The more significant byte contains in its least significant bit a designation which is not used in the present embodiment being described but which is reserved for a designation of a logic fault. The second least significant bit of this byte identifies whether or not an Inhibit signal is to be effective as will be more fully explained and the two most significant bits designated, respectively in ascending order, SA60° and SA120° designate shift angles, respectively, of 60degrees and 120 degrees which are effective when it is appropriate to shift between thyristors of the bridge relative to different phases as will become more apparent as this description proceeds. Attached as Appendix A is a complete memory map illustrating the total contents of the control memory for one particular implementation of the present invention.

Returning now to FIG. 4, it is seen that the control memory 76 provides the output signals 1NA, 1NB and 1NC, respectively, to the D terminals of three flip-flops or latches, respectively, 80, 82 and 84. As previously indicated, these three signals designate, in the embodiment here being described, two of the six thyristors of the forward or reverse power conversion bridge which are next to be fired. A fourth latch 86 has applied to its D input the 1RROT signal which denotes, in the case of a motor load, direction of torque and, hence, in the broader sense the designation within the bridge of whether the forward or the reverse thyristors will be fired. Thus, the outputs of these four latches designated 1PA, 1PB, 1PC and 1PD designate the then being fired thyristors within the bridge. Latches 80 through 86 change their state upon the application of a signal 1FIRE which signal will be developed later in this description.

FIG. 9 is a decode truth table which illustrates the manner in which the signals 1PA through 1PD identify the individual cell combinations to be fired at any particular time. The depiction there, of course, is one which was selected to work in the presently being described embodiment. While it is not intended to go through the total of the truth table, as an example it is seen that for 1PA equal to 1 and the rest of the signals equal to 0, cells 1F and 2F (FIG. 1) are rendered conductive. The signals 1PA through 1PD serve, along with the signal 1RROT and the five most significant bits of the output of the binary counter 66 as the address signals for the control memory 76.

In addition to the output signals 1NA, 1NB and 1NC, as a function of the addressed location memory 76 also provides the signals earlier discussed with respect to FIG. 8; namely, 1PLT, Inhibit, SA120° and SA160°. The latter three signals combine with the six least significant bit output of the binary counter 66 to address the sinusoid memory 78. Memory 78 contains, in its storage locations, the sequential values of a 180 degree cosine wave in increments or steps of 15/16 degrees. Thus, 193 memory locations are utilized in memory 78 for the cosine wave. It should be pointed out that, in an actual implementation, in order to avoid negative numbers the actual contents of the sinusoid memory 78 were valued at 1 plus the cosine. A memory map of the memory 78 locations is shown in Appendix B. Referencing the map, it is seen that hexadecimal locations 000-0C0 are used for the cosine wave. Because a 9-bit address is used, all additional available locations (0C1-1FF) are coded all binary "1's" to prevent the thyristors of the converter from firing.

Referring now to FIG. 5, it is first seen that there is provided an inversion fault detection circuit 18 which provides an output signal InF to the force firing circuit 20. The inversion fault detection circuit has not been shown in detail in that its exact nature is not of importance to the present invention and it may be any of those which are known in the art which provides an output signal in the event of what is commonly called a d.c. fault or "shoot through". Also shown is a line detection circuit 16 which provides the signal $I_A$ to the force firing circuit 20. The signal $I_A$ is, as previously mentioned, indicative of the magnitude of the current flowing in the source lines and is shown as being derived by three current transformers 88, 90 and 92 coupled, respectively, to the three lines $L_1$, $L_2$ and $L_3$. The outputs of these three transformers are supplied to a suitable rectification bridge 94 the output of which is a d.c. signal proportional to the magnitudes of the currents in the three lines. Signal $I_A$ is applied to a suitable analog-to-digital converter 96 located within the force firing circuit 20 and the output of the converter is shown as five lines carrying digital signals which will be representative of the magnitude of the signal $I_A$. That is, the signals on these lines define a commutation angle which is necessary to commutate the amount of current sensed. Normally, the higher the current the greater the required commutation time. These five lines from the converter 96 serve as inputs to a switch 98. There is also provided as inputs to the switch 98, five lines labeled "strapped inputs @ 90°". These inputs may derive from operator settable switches and carry a designation proportional to an angle of 90 degrees. If an inversion fault is present as identified by the InF signal from the circuit 18 being high, these strapped inputs will be supplied by switch 98 as outputs on the five output lines from the switch. In the absence of an inversion fault, switch 98 will pass the signals from the analog-to-digital converter 96.

The five output lines from switch 98 carry a designation, in binary form, of an angle limit which is supplied to a comparator 100. Also supplied as an input to the comparator 100 are three signals from the digital angle synthesizer 12 (signals 15°/2, 15° and 130°) and the SA60° and SA120° signals from the control memory 76. As illustrated in FIG. 5, the output of the switch 98 may be considered the A word and the inputs from the memory system and the digital angle synthesizer considered the B word. Comparator 100 makes a simple comparison of the values of these two digital words and provides an output 1FF (force fire) when the A word is greater than or equal to the B word. Thus, it is seen that the 1FF signal is provided in the case of an inversion fault or at any other time when it is necessary to fire a rectifier at other than a normal time to insure commutation of the then conducting rectifiers of the bridge.

With continued reference to FIG. 5, the eight signal output of the sinusoid memory 78 is applied as an input to the firing logic 22 and more particularly to a digital-to-analog converter 102 within that logic. The digitalto-analog converter 102, in response to sequential inputs from the memory 78, provides as its output a cosine shaped wave which is, as previously mentioned offset by a value of one to insure that it does not go negative. The output of converter 102 is applied to the inverting input of a comparator 104 which has applied to its noninverting input the output of an amplifier 106. Amplifier 106 has a reference signal applied to its inverting input by way of a resistor 108 and to its noninverting input by way of a resistor 118. The generation of the reference signal is graphically illustrated as being derived from a potentiometer 110 connected between a source of positive voltage (+V) and ground. This is an operator settable reference and provides a d.c. level reference which is proportional to the desired output of the converter of FIG. 1. A feedback resistor 112 is connected between the inverting input of the amplifier 106 and its output. Amplifier 106 has a gain of ±1 to thereby deliver to the comparator 104 a plus or minus value proportional to the reference from the potentiometer 110. The sign of this signal is a function of the signal 1PD previously discussed. In FIG. 5, the 1PD signal is shown applied to a coil 114 of the relay having a normally open contact 116. When 1PD has a value of "1", illustrating the desirability of reverse direction operation, contact 116 is closed and the noninverting input of the amplifier 106 is connected to ground. When 1PD equals "0" switch 116 remains open. Thus, it is seen that the output of the amplifier 106 is as was previously mentioned an analog signal equal to either the positive or negative value of the value set by the reference set by the potentiometer 110.

Comparator 104, in response to its two inputs, provides a logic "1" signal at its output when the value of the signal from the digital-to-analog converter 102 (the value of the biased cosine wave) is less than or equal to the reference signal applied from amplifier 106. Conversely, a logic "0" signal output is provided by the comparator 104 when the reference is less than the cosine signal from converter 102.

Still referencing the firing logic 22 of FIG. 5, it is seen that there are provided six input signals labeled "Inhibit Inputs". These inputs are not directly associated with the present invention but are included for purposes of completeness and, in an operative system would be inputs from other parts of the system which would serve as safety measures to inhibit the operation of the converter of the present system when some malfunction such as overcurrent, overvoltage, etc. were present. The six Inhibit Inputs are shown as being applied three each to a pair of OR gates 120 and 124 the outputs of which are, respectively, provided to inverting circuits 126 and 128. The outputs of the two inverting circuits 126 and 128 will be at a high binary level when there is no inhibiting from other parts of the circuit and will be at a low level to thus inhibit a pair of AND gates 130 and 132 when there is reason to inhibit operation of the system. A second input to AND gate 130 is the logic level from the comparator 104. The second input to AND gate 132 is the signal 1FF previously described. The outputs of these two AND gates serve as inputs to an OR gate 134, the output of which is the 1FIRE signal. Thus, it is seen that the 1FIRE signal is generated in the absence of an Inhibit Input, and whenever there is a force fire signal (1FF) or whenever the value of the biased cosine wave as derived through the digital-to-analog converter 102 is higher than the reference signal supplied by way of potentiometer 110.

As seen in FIG. 6, the 1FIRE signal which is provided by the firing logic 22 of FIG. 5 is applied to a pulse train generator 136 which provides as its output a train of pulses to provide what is known as "pulse train firing" as is well known in the art. This train of pulses is applied as one input to an OR gate 138 which has as additional inputs the signal 1PTL from the memory 22 and an additional signal 1IA28 which will be developed hereinafter. The output of the OR gate 138 is applied to the disable terminal of a decode logic tree network 140. Additional inputs to the logic tree 140 include the signals 1PA, 1PB, 1PC and 1PD which are derived from the memory latches 82–86. In response to these input signals, the network 140 selects two of twelve output lines designated GD1F through GD6F and GD1R through GD6R (reference FIG. 9). Signals appearing on these lines go to the gate terminals (or gating circuitry) of the respectively identified thyristors of the bridge (FIG. 1) and serve as firing signals thereto. Thus it is seen that in the absence of either the 1PTL signal from the memory or the 1IA28 signal there will appear at the outputs of the tree 140 which are selected by the four input lines 1PA through 1PD a train of pulses having the same frequency as the pulse train generator 36. That is, in that the 1PA through 1PD signals will normally hold the designated lines high and the pulse train generator 136 is applying a train of pulses which disables the network 140, the outputs thereof are of the same frequency in accordance with the off times of the pulse train from the generator 136. The signals appearing on the lines GD1F through GD6F and GD1R through GD6R therefore control the operation or the firing sequence of the thyristors of the bridge which in turn control the power supplied to the load.

The sole remaining depiction in FIG. 2 to be explained is the reversing logic 26 shown in FIG. 2 which generates the signal 1RROT previously discussed which determines the package (forward or reverse) of thyristors to be used. In the implementation here a logic "0" denotes the forward package and a logic "1" the reverse package. The reversing logic 26 as shown in FIG. 6 includes a pair of switches 142 and 144. These switches are operator controlled and serve, respectively, to allow selection of either only forward or reverse operation. A signal 1SFD resulting from the closure of switch 142 is applied to an inverter 146 the output of which is provided to an AND gate 148. A signal 1SF, effected when switch 144 is closed, is provided by way of an inverter 150 to a second input to the AND gate 148. In the absence of either of the switches being closed, AND 148 is enabled and the output of this gate supplies one input to an OR gate 152 which provides as its output the signal 1RROT. Thus, if both switches are closed only reverse operation may be obtained; i.e., 1RROT will be a "1". If the signal 1SFD is high (switch 142 open) the value of 1RROT is a function of the signals 1FIRE and OIA28 as will be explained.

Still with reference to FIG. 6, it is seen that the signal $I_A$ from the line current detection circuit 16 is applied to the noninverting input of a comparator 154 which has its noninverting input connected to the positive reference voltage indicated as a battery 155. The output of the comparator 154 designated 1IA serves as an input to the D terminal of a flip-flop 156 the one output of which is the 1IA28 signal which serves as an input to the OR gate 138 of the cell select and firing circuit 24. The 15°/8 signal from the digital angle synthesizer 12 serves as a clock and is applied to the trigger input to a 4-bit binary counter 158. The enable terminal of the counter 158 receives its input from the "1" output of a flip-flop 160 which has its D terminal connected to ground and its trigger terminal connected to the carry output of the counter 158. The set terminal of the flip-flop 160 receives as an input signal the 1FIRE signal previously discussed. Thus, flip-flop 160 will set with each occurrence of the 1FIRE signal and will enable the 4-bit binary counter which will count the 15°/8 signals from the memory. In that this is a 4-bit counter, the carry terminal will have a high level signal once for each occurrence of the 1FIRE signal and this carry signal will exist for a period of time equal to 15°/8 and terminate at 30 electrical degrees (16×15/8) after the occurrence of the 1FIRE signal. This output from the carry terminal of the counter 158 serves as the trigger input to the flip-flop 156 which also has its clear terminal connected to the 1FIRE signal. The "1" output of flip-flop 156 is the 1IA28 signal previously discussed and it it seen that this signal will be present, assuming that source current is present, for a period extending from approximately 28 degrees after the occurrence of 1FIRE until the next occurrence 1FIRE. This signal is applied to the OR gate 138 of the cell select and firing logic 24 to thereby disable that circuit. The remaining depiction of FIG. 6 shows the "0" output of a flip-flop 156 serving as one input (01A28) to an exclusive OR gate 162 the other input to which is the IPD signal. Thus, when either of the inputs, but not both, to the exclusive OR gate 162 is present there will be a high level signal at the output thereof which serves as one input to an AND gate 164, the second input of which is the previously described signal 1SFD. This is the second means by which the 1RROT signal is generated as shown by the fact that the output of the AND gate 164 serves as a second input to the OR gate 152. As such, if the output of AND 148 is low and 1SFD is high, the value of 1RROT will be high ("1") when either (not both) 1PD or 01A28 is high.

Thus, it is seen that there has been shown and described a system which permits the use of a single comparision circuit to generate the multiple firing signals applicable to a power conversion bridge which eliminates the need and the inherent errors of multiple circuits. Excellent noise isolation is achieved by the binary nature of the circuit and the ease of changing firing sequence is apparent from the fact that the memory content, or the memories in the case of the use of ROMS, may be easily changed. By the nature of the system, the firing sequence may be optimized especially during a reversing and alternate methods of force firing from digital inputs which are readily provided are achievable to overall provide a high performance of firing control circuit at moderate cost.

While there has been shown and described what is at present considered to be preferred embodiment of the present invention, modifications thereto will readily occur to those skilled in the art. It is not desired, therefore, that the invention be limited to the specific circuit shown and described and it is intended to cover in the appended claims all such modifications as fall within the true spirit and scope of the invention.

Appendix A

| Location | Content |
|---|---|
| 000 | 9D 9D 9D 9D 9E 9E 9E 9E 99 99 99 99 9A 9A 9A 9A |
| 010 | 9B 9B 9B 9B 9C 9C 9C 9C 28 28 28 28 28 28 28 28 |
| 020 | 22 22 22 22 12 12 12 12 52 52 52 52 9A 9A 9A 9A |
| 030 | 2A 2A 2A 2A 2A 2A 2A 2A 28 28 28 28 28 28 28 28 |
| 040 | 2B 2B 2B 2B 23 23 23 23 13 13 13 13 53 53 53 53 |
| 050 | 9B 9B 9B 9B 2B 2B 2B 2B 28 28 28 28 28 28 28 28 |
| 060 | 2C 2C 2C 2C 2C 2C 2C 2C 24 24 24 24 14 14 14 14 |
| 070 | 54 54 54 54 9C 9C 9C 9C 28 28 28 28 28 28 28 28 |
| 080 | 9D 9D 9D 9D 2D 2D 2D 2D 2D 2D 2D 2D 25 25 25 25 |
| 090 | 15 15 15 15 55 55 55 55 28 28 28 28 28 28 28 28 |
| 0A0 | 56 56 56 56 9E 9E 9E 9E 2E 2E 2E 2E 2E 2E 2E 2E |
| 0B0 | 26 26 26 26 16 16 16 16 28 28 28 28 28 28 28 28 |
| 0C0 | 11 11 11 11 51 51 51 51 99 99 99 99 29 29 29 29 |
| 0D0 | 29 29 29 29 21 21 21 21 28 28 28 28 28 28 28 28 |
| 0E0 | 8D 8D 8D 8D 8E 8E 8E 8E 89 89 89 89 8A 8A 8A 8A |
| 0F0 | 8B 8B 8B 8B 8C 8C 8C 8C 28 28 28 28 28 28 28 28 |
| 100 | 8D 8D 8D 8D 8E 8E 8E 8E 89 89 89 89 8A 8A 8A 8A |
| 110 | 8B 8B 8B 8B 8C 8C 8C 8C 28 28 28 28 28 28 28 28 |
| 120 | 2B 3B 3B 3C 3C 3D 3D 3E 3E 39 39 3A 3A 3B 3B 3B |
| 130 | 2B 2B 2B 2B 2B 2B 2B 2B 28 28 28 28 28 28 28 28 |
| 140 | 2C 2C 2C 2C 2C 3C 3C 3D 3D 3E 3E 39 39 3A 3A 3B |
| 150 | 3B 3C 3C 2C 2C 2C 2C 2C 28 28 28 28 28 28 28 28 |
| 160 | 2D 2D 2D 2D 2D 2D 2D 2D 2D 3D 3D 3E 3E 39 39 3A |
| 170 | 3A 3B 3B 3C 3C 3D 3D 2D 28 28 28 28 28 28 28 28 |
| 180 | 3D 3E 3E 2E 2E 2E 2E 2E 2E 2E 2E 2E 2E 3E 3E 39 |
| 190 | 39 3A 3A 3B 3B 3C 3C 3D 28 28 28 28 28 28 28 28 |
| 1A0 | 3C 3D 3D 3E 3E 39 39 29 29 29 29 29 29 29 2A 2A |
| 1B0 | 29 39 39 3A 3A 3B 3B 3C 28 28 28 28 28 28 28 28 |
| 1C0 | 3B 3C 3C 3D 3D 3E 3E 39 39 3A 3A 2A 2A 2A 2A 2A |
| 1D0 | 2A 2A 2A 2A 2A 3A 3A 3B 28 28 28 28 28 28 28 28 |
| 1E0 | 8D 8D 8D 8D 8E 8E 8E 8E 89 89 89 89 8A 8A 8A 8A |
| 1F0 | 8B 8B 8B 8B 8C 8C 8C 8C 28 28 28 28 28 28 28 28 |
| 200 | 8D 8D 8D 8D 8E 8E 8E 8E 89 89 89 89 8A 8A 8A 8A |
| 210 | 8B 8B 8B 8B 8C 8C 8C 8C 28 28 28 28 28 28 28 28 |
| 220 | 2B 3B 3B 3C 3C 3D 3D 3E 3E 39 39 3A 3A 3B 3B 3B |
| 230 | 2B 2B 2B 2B 2B 2B 2B 2B 28 28 28 28 28 28 28 28 |
| 240 | 2C 2C 2C 2C 2C 3C 3C 3D 3D 3E 3E 39 39 3A 3A 3B |
| 250 | 3B 3C 3C 2C 2C 2C 2C 2C 28 28 28 28 28 28 28 28 |
| 260 | 2D 2D 2D 2D 2D 2D 2D 2D 2D 3D 3D 3E 3E 39 39 3A |
| 270 | 3A 3B 3B 3C 3C 3D 3D 2D 28 28 28 28 28 28 28 28 |
| 280 | 3D 3E 3E 2E 2E 2E 2E 2E 2E 2E 2E 2E 2E 3E 3E 39 |
| 290 | 39 3A 3A 3B 3B 3C 3C 3D 28 28 28 28 28 28 28 28 |
| 2A0 | 3C 3D 3D 3E 3E 39 39 29 29 29 29 29 29 29 2A 2A |
| 2B0 | 29 39 39 3A 3A 3B 3B 3C 28 28 28 28 28 28 28 28 |
| 2C0 | 3B 3C 3C 3D 3D 3E 3E 39 39 3A 3A 2A 2A 2A 2A 2A |
| 2D0 | 2A 2A 2A 2A 2A 3A 3A 3B 28 28 28 28 28 28 28 28 |
| 2E0 | 8D 8D 8D 8D 8E 8E 8E 8E 89 89 89 89 8A 8A 8A 8A |
| 2F0 | 8B 8B 8B 8B 8C 8C 8C 8C 28 28 28 28 28 28 28 28 |
| 300 | 8D 8D 8D 8D 8E 8E 8E 8E 89 89 89 89 8A 8A 8A 8A |
| 310 | 8B 8B 8B 8B 8C 8C 8C 8C 28 28 28 28 28 28 28 28 |
| 320 | 22 22 22 22 12 12 12 12 52 52 52 52 9A 9A 9A 9A |
| 330 | 2A 2A 2A 2A 2A 2A 2A 2A 28 28 28 28 28 28 28 28 |
| 340 | 2B 2B 2B 2B 23 23 23 23 13 13 13 13 53 53 53 53 |
| 350 | 9B 9B 9B 9B 2B 2B 2B 2B 28 28 28 28 28 28 28 28 |
| 360 | 2C 2C 2C 2C 2C 2C 2C 2C 24 24 24 24 14 14 14 14 |
| 370 | 54 54 54 54 9C 9C 9C 9C 28 28 28 28 28 28 28 28 |
| 380 | 9D 9D 9D 9D 2D 2D 2D 2D 2D 2D 2D 2D 25 25 25 25 |
| 390 | 15 15 15 15 55 55 55 55 28 28 28 28 28 28 28 28 |
| 3A0 | 56 56 56 56 9E 9E 9E 9E 2E 2E 2E 2E 2E 2E 2E 2E |
| 3B0 | 26 26 26 26 16 16 16 16 28 28 28 28 28 28 28 28 |
| 3C0 | 11 11 11 11 51 51 51 51 99 99 99 99 29 29 29 29 |
| 3D0 | 29 29 29 29 21 21 21 21 28 28 28 28 28 28 28 28 |
| 3E0 | 8D 8D 8D 8D 8E 8E 8E 8E 89 89 89 89 8A 8A 8A 8A |
| 3F0 | 8B 8B 8B 8B 8C 8C 8C 8C 28 28 28 28 28 28 28 28 |

Appendix B

| Location | Contents |
|---|---|
| 000 | FF FF FF FF FF FF FF FF FF FF FE FE FE FD FD FC |
| 010 | FC FB FA FA F9 F9 F8 F7 F6 F5 F5 F4 F3 F2 F1 F0 |
| 020 | FF FE ED EC EA E9 E8 E7 E6 E4 E3 E2 E0 DF DD DC |
| 030 | DB D9 D7 D6 D4 D3 D1 D0 CF CC CB C9 C7 C5 C4 C2 |

-continued
Appendix B

| Location | Contents |
|---|---|
| 040 | C0 BE BC BA B9 B7 B5 B3 B1 AF AD AB A9 A7 A5 A3 |
| 050 | A1 9F 9D 9B 99 97 95 93 91 8F 8D 8A 88 86 84 82 |
| 060 | 80 7E 7C 7A 78 76 73 71 6F 6D 6B 69 67 65 63 61 |
| 070 | 5F 5D 5B 59 57 55 53 51 4F 4D 4B 49 47 46 44 42 |
| 080 | 40 3E 3C 3B 39 37 35 34 32 30 2F 2D 2C 2A 29 27 |
| 090 | 25 24 23 21 20 1E 1D 1C 1A 19 18 17 16 14 13 12 |
| 0A0 | 11 10 0F 0E 0D 0C 0B 0B 0A 09 08 07 07 06 06 05 |
| 0B0 | 04 04 03 03 02 02 02 01 01 01 01 00 00 00 00 00 |
| 0C0 | 00 FF FF FF FF FF FF FF FF FF FF FF FF FF FF FF |
| 0D0 | |
| 0E0 | |
| 0F0 | |
| 100 | |
| 110 | |
| 120 | |
| 130 | |
| 140 | |
| 150 | |
| 160 | All Locations: FF |
| 170 | |
| 180 | |
| 190 | |
| 1A0 | |
| 1B0 | |
| 1C0 | |
| 1D0 | |
| 1E0 | |
| 1F0 | |

What is claimed is:

1. A circuit for generating signals for rendering conductive the controlled rectifiers of a power conversion system to thereby control the power supplied to a load from a source of alternating current voltage comprising:
   (a) means to sense a designated point in the cycle of the source voltage and to supply an output signal in response thereto;
   (b) means responsive to said output signal to develop multiple bit address signals representing a time-phase relationship with respect to said designated point;
   (c) a memory system having a plurality of selectively addressable, multiple bit storage locations to be addressed by said address signals, individual ones of said storage locations each containing predetermined data designating the firing sequence and time of firing the rectifiers of the power conversion system; and,
   (d) means responsive to the contents of the addressed locations to develop signals for the selective rendering conductive of individual ones of said rectifiers.

2. The invention in accordance with claim 1 wherein said means to develop said address signals develops a digital count.

3. The invention in accordance with claim 1 wherein said memory system is comprised of two distinct areas, the first of said areas containing data respecting the sequence of cell firing and the second of said areas containing values corresponding to a sinusoidal wave shape.

4. The invention in accordance with claim 3 wherein the address for said first area of memory is comprised of a portion of said address signals and a portion of the contents of the previously addressed location of said first area and the address for said second area of memory is comprised of a second portion of said address signals and a second portion of the contents of the last addressed location of the first area.

5. The invention in accordance with claim 4 further including means to develop an additional signal indicative of one of two types of converter operation, said additional signal being included within the address of said first area of memory.

6. The invention in accordance with claim 5 for application when the power conversion system supplies power to a motor load wherein said additional signal designates desired direction of motor torque.

7. The invention in accordance with claim 3 wherein said memory system comprises first and second read only memories as said first and second areas.

8. The invention in accordance with claim 1 further including means responsive to signals indicative of prescribed system operating conditions to alter the development of the signals for rendering the rectifiers conductive.

9. A firing circuit for the generation of firing signals operative to selectively render conductive the individual cells of a power converter supplying a d.c. load from a polyphase a.c. source comprising:
   (a) means to identify a prescribed relationship between two phase voltages of said source and to output a signal indicative thereof;
   (b) synthesizing means responsive to said signal for developing a multiple bit digital count representing a phase displacement with respect to said prescribed relationship;
   (c) a memory system including a plurality of selectively addressable, multiple bit storage locations to be addressed by said digital count, said storage locations each retaining predetermined data defining the angle and sequence of rendering the cells of the converter conductive; and,
   (d) means responsive to the contents of sequentially addressed storage locations to generate the signals for rendering the cells conductive.

10. The invention in accordance with claim 9 wherein said synthesizing means includes means to generate a series of pulses at a rate which is a multiple of the frequency of the a.c. source and a digital counter response to said pulses for developing said count.

11. The invention in accordance with claim 9 wherein said memory system is comprised of two distinct areas, the first of said areas containing data respecting the sequence of cell firing and the second of said areas containing values corresponding to a sinusoidal wave shape.

12. The invention in accordance with claim 11 wherein the address for said first area of memory is comprised of a portion of said count and a portion of the contents of the previously addressed location of said first area and the address for said second area of memory is comprised of a second portion of said count and a second portion of the contents of the last addressed location of the first area.

13. The invention in accordance with claim 12 further including means to develop an additional signal indicative of one of two types of converter operation, said additional signal being included within the address of said first area of memory.

14. The invention in accordance with claim 13 for application when the power conversion system supplies power to a motor load wherein said additional signal designates desired direction of motor torque.

15. The invention in accordance with claim 11 wherein said memory system comprises first and second read only memories as said first and second areas.

16. A circuit for generating firing pulses for rendering conductive the thyristors of a power conversion system at a specified time with respect to an alternating current input signal comprising:
 (a) means to sense a designated point in the cycle of the input signal and to provide an output signal in response thereto;
 (b) means responsive to said output signal to develop a digital count representing a timephase relationship with respect to said designated point;
 (c) first memory means having a plurality of selectively addressable storage locations the individual contents of which designate the next cell of the converter to be fired and a desired shift angle of thyristor firings, said first memory means being addressed in response to address signals applied thereto, a first portion of said address signals comprised of a selected part of said digital count and a second portion derived from a latch means;
 (d) latch means for providing said second portion in response to selected input signals including a portion of the contents of the last addressed location of said first memory means designating the next cell to be fired, a signal designating cell firing sequence and a firing control signal indicative of a proper time for firing a cell;
 (e) a second memory means having a plurality of selectively addressable storage locations the individual contents of which represent individual points of a sinusoid wave shape, said second memory means receiving address signals comprised of a second portion of said digital count and an output of the first memory means resulting from the then being addressed location and designating a shifted angle for the next to be fired thyristor;
 (f) a digital-to-analog converter responsive to the contents of sequentially addressed locations of said second memory means to develop an output signal representing at least a segment of a sinusoidal wave;
 (g) means to generate a reference signal indicative of a desired output of the converter;
 (h) comparator means responsive to said reference signal and the contents of the then being addressed location of said second memory means to develop an output signal indicative of the time to fire a cell in said converter; and,
 (i) further means within said logic means responsive to the output of said comparator means to outut a signal to effect the firing of converter cells.

* * * * *